No. 642,596. Patented Feb. 6, 1900.
J. A. FORNEY.
NUT LOCK.
(Application filed Oct. 12, 1899.)
(No Model.)
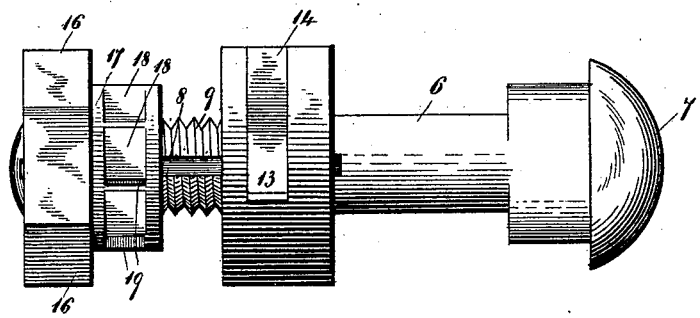
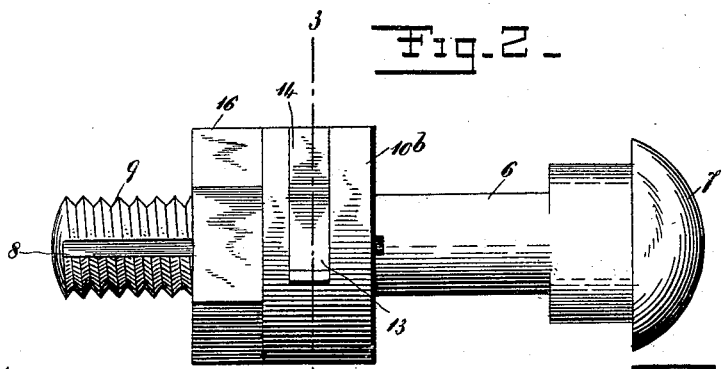
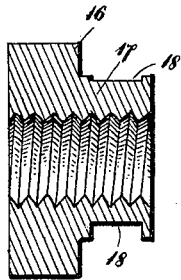
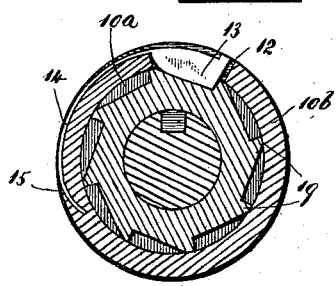
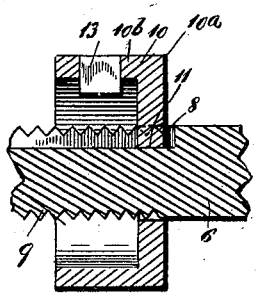
Witnesses.
Inventor.
Attorneys
THE NORRIS PETERS CO., PHOTO-LITHO., WASHINGTON, D. C.

UNITED STATES PATENT OFFICE.

JOHN A. FORNEY, OF FRACKVILLE, PENNSYLVANIA.

NUT-LOCK.

SPECIFICATION forming part of Letters Patent No. 642,596, dated February 6, 1900.

Application filed October 12, 1899. Serial No. 733,345. (No model.)

*To all whom it may concern:*

Be it known that I, JOHN A. FORNEY, a citizen of the United States, residing at Frackville, in the county of Schuylkill and State of Pennsylvania, have invented certain new and useful Improvements in Nut-Locks, of which the following is a full and complete specification, such as will enable those skilled in the art to which it appertains to make and use the same.

This invention relates to nut-locks, and the object thereof is to provide an improved device of this class whereby the accidental loosening of nuts is prevented; and my invention consists of the construction and arrangement of parts as described in the following specification, of which the accompanying drawings form a part, in which like reference characters denote like parts in the several views, and in which—

Figure 1 is a side view of a bolt provided with my improved nut-lock devices in inoperative position; Fig. 2, a similar view with the parts in operative position; Fig. 3, a section on the line 3 3 of Fig. 2; Fig. 4, a longitudinal sectional view of an improved nut which I employ, and Fig. 5 a longitudinal sectional view of the bolt and the improved cup-shaped washer which I employ shown mounted thereon.

Referring more particularly to the drawings, I have shown at 6 a bolt provided with a head 7 and a longitudinal groove 8 formed in one side and in the threaded portion 9 thereof.

In the practice of my invention I provide a cup-shaped washer 10, bored to fit slidably the bolt 6 and provided with a lug 11, which fits the groove 8. The washer 10 consists of the disk portion $10^a$, which fits the bolt 6, and the annular flange $10^b$, which forms an annular chamber surrounding said bolt. The annular flange $10^b$ is provided with an opening 12 at one side, and a dog 13 is loosely mounted therein and provided with a plate-spring extension 14, which is, as shown in Fig. 3, curved to follow the contour of the flange $10^b$, which is slightly chambered to receive the same, and the end of said spring extension 14 is passed into and fixed in the flange $10^b$, as at 15. In normal position the dog 13 projects into the annular chamber within the flange $10^b$.

The body portion of the nut which I employ is shown at 16 and is provided at one end with an extension 17, and the body portion and extension thereof are both bored and threaded to fit the bolt 8. The nut extension 17 is circular in form, as shown in Fig. 1, and of sufficient diameter to fit within the annular flange $10^b$ of the nut 10. The annular surface of the said extension is plurally chambered or recessed, as at 18, and said recesses are wedge-shaped in form, being deeper at one end than at the other, and are separated by ridges 19 and so formed that when the nut extension 17 is screwed onto the bolt the deeper ends of said chambers 18 first pass any radial plane of the bolt 8.

The operation of my improved nut-lock device will be evident from the foregoing description when taken in connection with the accompanying drawings and the following statement thereof:

The washer 10 is first passed onto the bolt to the required extent, as determined by the class of work or particular operation being performed, the lug 11 sliding in the groove 8. The nut 16 17 is then screwed onto the bolt until the extension 17 passes beneath the flange 10 of the washer, the dog 13 engaging successively the ridges 19 and riding into the chambers 18 until such time as the nut shall be screwed home, when the dog 13 will be within one of the recesses 18 and abut against one of the ridges 19 to prevent reverse rotation of the nut 16 17, being maintained thereagainst by the spring 14.

It is evident that I may considerably vary the construction and arrangement of the elements, as above described, without departing from the spirit of my invention or sacrificing the advantages thereof.

Having fully described my invention, I claim as new and desire to secure by Letters Patent—

The herein-described nut-lock device, comprising a bolt, a cup-shaped washer passed thereon, devices for preventing relative revolution of said bolt and washer, said cup-shaped washer being provided with an opening at one side, a dog loosely mounted in said opening and provided with a curved plate-spring extension curved to follow the contour of said cup-shaped washer which is chambered to receive the same, the inner end of said extension being connected with said washer, and a nut provided with an extension and which is screwed upon said bolt, said extension being provided with a plurality of wedge-shaped peripheral recesses forming shoulders in connection with which said dog operates to prevent rotation of said nut in one direction, substantially as shown and described.

In testimony that I claim the foregoing as my invention I have signed my name, in presence of the subscribing witnesses, this 5th day of October, 1899.

JOHN A. FORNEY.

Witnesses:
GOMER B. PHILLIPS,
THOMAS DAVIS.